US 12,304,519 B2

United States Patent
Zhang et al.

(10) Patent No.: US 12,304,519 B2
(45) Date of Patent: May 20, 2025

(54) PARKING INTERACTION METHOD AND APPARATUS, STORAGE MEDIUM, ELECTRONIC DEVICE AND VEHICLE

(71) Applicant: Momenta (Suzhou) Technology Co., Ltd., Suzhou (CN)

(72) Inventors: Yunhong Zhang, Suzhou (CN); Fang Chen, Suzhou (CN); Yue Tuo, Suzhou (CN); Lu Liu, Suzhou (CN)

(73) Assignee: Momenta (Suzhou) Technology Co., Ltd., Suzhou (CN)

( * ) Notice: Subject to any disclaimer, the term of this patent is extended or adjusted under 35 U.S.C. 154(b) by 53 days.

(21) Appl. No.: 18/482,086

(22) Filed: Oct. 6, 2023

(65) Prior Publication Data

US 2024/0034346 A1     Feb. 1, 2024

Related U.S. Application Data

(63) Continuation of application No. PCT/CN2022/100663, filed on Jun. 23, 2022.

(51) Int. Cl.
*B60W 50/14* (2020.01)
*B60K 35/00* (2024.01)
(Continued)

(52) U.S. Cl.
CPC ............. *B60W 50/14* (2013.01); *B60K 35/00* (2013.01); *B60W 30/06* (2013.01); *G01S 13/931* (2013.01);
(Continued)

(58) Field of Classification Search
CPC ................. B60W 50/14; B60W 30/06; B60W 2420/408; B60W 2050/146; B60K 35/00;
(Continued)

(56) References Cited

U.S. PATENT DOCUMENTS

2018/0130351 A1* 5/2018 Ha ............................ B60R 1/22
2018/0246515 A1* 8/2018 Iwama ................. G05D 1/0251
(Continued)

FOREIGN PATENT DOCUMENTS

| CN | 103101496 A | 5/2013 |
| CN | 104571101 A | 4/2015 |

(Continued)

OTHER PUBLICATIONS

China Patent Office, International Search Report, Application No. PCT/CN2022/100663, mailed Dec. 20, 2022, 4 pages.
(Continued)

*Primary Examiner* — Chico A Foxx
(74) *Attorney, Agent, or Firm* — Ziegler IP Law Group, LLC.

(57) ABSTRACT

The present disclosure provides a parking interaction method and apparatus, a storage medium, an electronic device and a vehicle, and belongs to the field of vehicle technologies. The method includes: outputting and displaying a currently-generated virtual parking image and a corresponding real parking image; receiving a parking space selection instruction for the virtual parking image, where the parking space selection instruction includes first position information of a to-be-parked target available parking space in the virtual parking image; according to a correspondence between the virtual parking image and the real parking image, determining second position information of the target available parking space in the real parking image; according to the first position information, highlighting the target available parking space in the virtual parking image, and according to the second position information, highlighting the target available parking space in the real parking image.

20 Claims, 3 Drawing Sheets

(51) Int. Cl.
*B60W 30/06* (2006.01)
*G01S 13/931* (2020.01)
*B60K 35/29* (2024.01)

(52) U.S. Cl.
CPC ........ *B60K 35/29* (2024.01); *B60K 2360/191* (2024.01); *B60K 2360/31* (2024.01); *B60W 2050/146* (2013.01); *B60W 2420/408* (2024.01); *G01S 2013/9314* (2013.01)

(58) Field of Classification Search
CPC .............. B60K 35/29; B60K 2360/191; B60K 2360/31; G01S 13/931; G01S 2013/9314
See application file for complete search history.

(56) References Cited

U.S. PATENT DOCUMENTS

| | | | | |
|---|---|---|---|---|
| 2022/0169118 A1* | 6/2022 | Nakashima | ............ | B60K 35/50 |
| 2022/0335832 A1* | 10/2022 | Okubo | .................. | G08G 1/142 |
| 2024/0296737 A1* | 9/2024 | Zhou | ........................ | G08G 1/14 |

FOREIGN PATENT DOCUMENTS

| | | | | |
|---|---|---|---|---|
| CN | 109693666 A | | 4/2019 | |
| CN | 111891119 A | | 11/2020 | |
| CN | 113715810 A | | 11/2021 | |
| EP | 3318470 A1 | | 5/2018 | |
| EP | 3663168 A1 | * | 6/2020 | ............. B60R 21/00 |
| EP | 4049908 A1 | * | 8/2022 | ............. B60W 30/06 |
| EP | 3816003 B1 | * | 8/2023 | ........... B60R 16/023 |

OTHER PUBLICATIONS

Wen Yi et al., "Panoramic parking system based on virtual reality technology and its extended application", Automotive Technology, Mar. 25, 2020, doi:10.3969/j.issn.1005-2550.2020.02.001, Issue 2.

* cited by examiner

PARKING INTERACTION METHOD AND APPARATUS, STORAGE MEDIUM, ELECTRONIC DEVICE AND VEHICLE

CROSS-REFERENCE TO RELATED APPLICATIONS

This application is a continuation of International Application No. PCT/CN2022/100663, filed on Jun. 23, 2022, which claims priority to Chinese Patent Application No. 202210684593.2, filed on Jun. 17, 2022. The disclosures of the aforementioned applications are hereby incorporated by reference in their entireties.

TECHNICAL FIELD

The present disclosure relates to the field of vehicle technologies, and in particular to a parking interaction method and apparatus, a storage medium, an electronic device and a vehicle.

BACKGROUND

Automatic parking system is an important part of an advanced driving assistance system or a self-driving system. After the automatic parking system is started, it can recognize obstacles and vacant parking spaces (also referred to as available parking spaces) around the self-driving vehicle through sensors, and generate a virtual parking image containing the self-driving vehicle, the surrounding vehicles and the vacant parking spaces, i.e. a Virtual Reality (VR) image. A driver may click to select a desired target available parking space in the VR image, and perform parking based on the target available parking space. But, regardless of automatic parking or manual parking, the driver needs to compare the VR image with the target available parking space labeled to the real physical world to determine a position of the target available parking space of the VR image in the real physical world, so as to assuredly and safely park into the target available parking space. Therefore, for the manual parking, since the VR image and the real physical world have different visual presentations, it is possible to take more time to compare both of them, thus reducing the parking efficiency. For the automatic parking, such visual presentation differences may bring a comparison anxiety to the driver, and consequently, the driver lacks a sense of safety and thus has to change the automatic parking to manual parking, reducing the reliability of the automatic parking system.

SUMMARY

The present disclosure provides a parking interaction method and apparatus, a storage medium, an electronic device and a vehicle, so as to address the following technical problems: in a parking process, a driver needs to compare a VR image with a target available parking space labeled to the real physical world to determine a position of the target available parking space of the VR image in the real physical world, so as to assuredly and safely park into the target available parking space; but, since the VR image and the real physical world have different visual presentations, it is possible to take more time to compare both of them, and bring comparison anxiety to the driver, leading to a decreased parking efficiency and a lowered reliability of an automatic parking system etc.

A specific technical solution is provided below.

According to a first aspect of embodiments of the present disclosure, there is provided a parking interaction method, including:
outputting and displaying a currently-generated virtual parking image and a corresponding real parking image;
receiving a parking space selection instruction for the virtual parking image, where the parking space selection instruction includes first position information of a to-be-parked target available parking space in the virtual parking image;
according to a correspondence between the virtual parking image and the real parking image, determining second position information of the target available parking space in the real parking image;
according to the first position information, highlighting the target available parking space in the virtual parking image, and according to the second position information, highlighting the target available parking space in the real parking image.

It can be known from the above solution that, in the embodiments of the present disclosure, a virtual parking image and a corresponding real parking image can be displayed at the same time, and when a driver selects a target available parking space in the virtual parking image, the target available parking space can be highlighted in both the virtual parking image and the real parking image. Thus, the driver can visually obtain a correspondence between the target available parking spaces in the virtual parking image and the real parking image without comparing, with efforts, the virtual parking image with the real physical world. Therefore, the parking efficiency is improved and the reliability of the automatic parking system is increased.

In a first possible implementation of the first aspect, according to the correspondence between the virtual parking image and the real parking image, determining the second position information of the target available parking space in the real parking image includes:
obtaining a target radar point cloud corresponding to the first position information, and obtaining a depth map corresponding to the real parking image;
searching for target depth information corresponding to the target radar point cloud in the depth map;
determining position information at the target depth information as the second position information.

In a second possible implementation of the first aspect, before determining the position information at the target depth information as the second position information, the method further includes:
based on a computer vision algorithm, recognizing available parking spaces in the real parking image as candidate available parking spaces;
determining the position information at the target depth information as the second position information includes:
in response to that depth information of the candidate available parking space includes the target depth information, determining the position information at the target depth information as the second position information.

It can be known from the above solution that, in the embodiments of the present disclosure, by achieving distance (or depth) matching for the target radar point cloud corresponding to the first position information in the virtual parking image and the depth map corresponding to the real parking image, the target depth information corresponding to the target radar point cloud is obtained, and when the target depth information is determined as depth information of a candidate available parking space in the real parking image, the position information at the target depth information is determined as the second position information of the target available parking space in the real parking image. Thus, it is further ensured that an available parking space is present at the determined second position information rather than at other positions, for example, occupied parking space, vehicle lane or other vacant places or the like, so as to improve the accuracy of determining the second position information.

In a third possible implementation of the first aspect, the method further includes:

in response to that the depth information of the candidate available parking space does not include the target depth information, determining a first reference object feature based on radar point cloud around the target radar point cloud;

based on the computer vision algorithm, recognizing a second reference object feature around each candidate available parking space;

determining position information of a target candidate available parking space as the second position information, where the target candidate available parking space is a candidate available parking space corresponding to the second reference object feature and successfully matching the first reference object feature.

It can be known from the above solution that, in the embodiments of the present disclosure, in response to failure to accurately obtain the second position information by distance (or depth) matching, the second position information can be determined by matching of the reference object features, so as to improve the accuracy of determining the second position information.

In a fourth possible implementation of the first aspect, after highlighting the target available parking space in the virtual parking image according to the first position information, and highlighting the target available parking space in the real parking image according to the second position information, the method further includes:

in a parking stage, highlighting a planned path from a self-driving vehicle to the second position information in the real parking image.

In a fifth possible implementation of the first aspect, outputting and displaying the currently-generated virtual parking image includes:

after receiving a start instruction of an automatic parking system, determining whether there is a first vehicle component, where the first vehicle component is a vehicle component with a current entity state not satisfying an automatic parking condition;

in response to presence of the first vehicle component, adjusting a virtual state of the first vehicle component of a self-driving vehicle model in an initially-generated virtual parking image to the current entity state of the first vehicle component;

outputting and displaying the state-adjusted virtual parking image and highlighting the first vehicle component;

the method further includes:

outputting first parking prompt information, where the first parking prompt information is used to prompt a driver to adjust the current entity state of the first vehicle component to a state satisfying the automatic parking condition.

It can be known from the above solution that, when the automatic parking condition is not satisfied, in addition to providing the first parking prompt information to the driver, the virtual state of the first vehicle component of the self-driving vehicle model in the initially-generated virtual parking image is adjusted to the current entity state of the first vehicle component, and when the state-adjusted virtual parking image is output and displayed, the first vehicle component is highlighted. In this way, the state of the self-driving vehicle model is made consistent with the state of the vehicle in the real world to provide the driver with an immersive experience, and further, the driver can visually and quickly find which first vehicle component does not satisfy the automatic parking condition and how to adjust, by combining the first parking prompt information with the highlighted first vehicle component, thereby increasing the efficiency of the driver for adjusting the first vehicle component and hence improving the parking efficiency.

In a sixth possible implementation of the first aspect, after highlighting the target available parking space in the virtual parking image according to the first position information, and highlighting the target available parking space in the real parking image according to the second position information, the method further includes:

in response to presence of a second vehicle component in the parking stage, along with change of an entity state of the second vehicle component, updating a virtual state of the second vehicle component of the self-driving vehicle model in the virtual parking image, and when displaying the updated virtual parking image, highlighting the second vehicle component where the second vehicle component is a vehicle component with an entity state subjected to visual dynamic change in the parking stage; and/or, in response to presence of a third vehicle component in the parking stage, when displaying the currently-generated virtual parking image, highlighting the third vehicle component and outputting second parking prompt information, where the third vehicle component is a vehicle component subjected to a parking operation error, and the second parking prompt information is used to prompt the driver about the parking operation error.

It can be known from the above solution that, in the parking stage, by making the virtual state of the second vehicle component in the self-driving vehicle model consistent with the entity state of the vehicle in the real world and highlighting the second vehicle component, the driver, whether located in the vehicle or not, can visually view the state change of the self-driving vehicle, so as to provide an immersive parking interaction experience to the driver. When the driver performs incorrect parking operation in the parking stage, with the third vehicle component subjected to parking operation error being highlighted on the self-driving vehicle model and the provision of the second parking prompt information, the driver can visually and quickly determine the incorrect parking operation by combining the prompt information with the highlighted third vehicle component and correct it in time, so as to improve the parking efficiency.

In a seventh possible implementation of the first aspect, outputting and displaying the currently-generated virtual parking image and the corresponding real parking image includes:

after starting the automatic parking system, outputting and displaying the currently-generated virtual parking image;

when a garage-searching instruction is received or a Reverse (R) gear is engaged, outputting and displaying the currently-generated real parking image on the basis of outputting and displaying the currently-generated virtual parking image.

In an eighth possible implementation of the first aspect, the real parking image is located on an upper layer of the virtual parking image and displaying positions of the real parking image and the virtual parking image are not overlapped.

According to a second aspect of embodiments of the present disclosure, there is provided a parking interaction apparatus, including:

an outputting and displaying unit, configured to output and display a currently-generated virtual parking image and a corresponding real parking image;

a receiving unit, configured to receive a parking space selection instruction for the virtual parking image, where the parking space selection instruction includes first position information of a to-be-parked target available parking space in the virtual parking image;

a determining unit, configured to, according to a correspondence between the virtual parking image and the real parking image, determine second position information of the target available parking space in the real parking image;

a highlighting unit, configured to highlight the target available parking space in the virtual parking image according to the first position information, and highlight the target available parking space in the real parking image according to the second position information.

It can be known from the above solution that, in the embodiments of the present disclosure, a virtual parking image and a corresponding real parking image can be displayed at the same time, and when a driver selects a target available parking space in the virtual parking image, the target available parking space can be highlighted in both the virtual parking image and the real parking image. Thus, the driver can visually obtain a correspondence between the target available parking spaces in the virtual parking image and the real parking image without comparing, with efforts, the virtual parking image with the real physical world. Therefore, the parking efficiency is improved and the reliability of the automatic parking system is increased.

In a first possible implementation of the second aspect, the determining unit includes:

an obtaining module, configured to obtain a target radar point cloud corresponding to the first position information, and obtain a depth map corresponding to the real parking image;

a searching module, configured to search for target depth information corresponding to the target radar point cloud in the depth map;

a first determining module, configured to determine position information at the target depth information as the second position information.

In a second possible implementation of the second aspect, the determining unit further includes:

a recognizing module, configured to, before determining the position information at the target depth information as the second position information, based on a computer vision algorithm, recognize available parking spaces in the real parking image as candidate available parking spaces;

the first determining module is configured to, in response to that depth information of the candidate available parking space includes the target depth information, determine the position information at the target depth information as the second position information.

In a third possible implementation of the second aspect, the determining unit further includes:

a second determining module, configured to, in response to that the depth information of the candidate available parking space does not include the target depth information, determine a first reference object feature based on radar point cloud around the target radar point cloud;

the recognizing module is further configured to, based on the computer vision algorithm, recognize a second reference object feature around each candidate available parking space;

the first determining module is further configured to determine position information of a target candidate available parking space as the second position information, where the target candidate available parking space is a candidate available parking space corresponding to the second reference object feature and successfully matching the first reference object feature.

In a fourth possible implementation of the second aspect, the highlighting unit is further configured to, after highlighting the target available parking space in the virtual parking image according to the first position information, and highlighting the target available parking space in the real parking image according to the second position information, highlight, in a parking stage, a planned path from a self-driving vehicle to the second position information in the real parking image.

In a fifth possible implementation of the second aspect, the outputting and displaying unit is further configured to, after receiving a start instruction of an automatic parking system, determine whether there is a first vehicle component, where the first vehicle component is a vehicle component with a current entity state not satisfying an automatic parking condition; in response to presence of the first vehicle component, adjust a virtual state of the first vehicle component of a self-driving vehicle model in an initially-generated virtual parking image to the current entity state of the first vehicle component; output and display the state-adjusted virtual parking image and highlight the first vehicle component;

the apparatus further includes:

a first prompt-outputting unit, configured to output first parking prompt information, where the first parking prompt information is used to prompt a driver to adjust the current entity state of the first vehicle component to a state satisfying the automatic parking condition.

In a sixth possible implementation of the second aspect, the highlighting unit is further configured to, after highlighting the target available parking space in the virtual parking image according to the first position information, and highlighting the target available parking space in the real parking image according to the second position information, in response to presence of a second vehicle component in the parking stage, along with change of an entity state of the second vehicle component, update a virtual state of the second vehicle component of the self-driving vehicle model in the virtual parking image, and when displaying the updated virtual parking image, highlight the second vehicle component, where the second vehicle component is a vehicle component with an entity state subjected to visual dynamic change in the parking stage; and/or, in response to presence of a third vehicle component in the parking stage, when displaying the currently-generated virtual parking image, highlight the third vehicle component, where the third vehicle component is a vehicle component subjected to a parking operation error.

the apparatus further includes:
a second prompt-outputting unit, configured to, when highlighting the third vehicle component, output second parking prompt information, where the second parking prompt information is used to prompt the driver about the parking operation error.

In a seventh possible implementation of the second aspect, the outputting and displaying unit includes:
a first outputting and displaying module, configured to, after the automatic parking system is started, output and display the currently-generated virtual parking image;
a second outputting and displaying module, configured to, when a garage-searching instruction is received or a Reverse (R) gear is engaged, output and display the currently-generated real parking image on the basis of outputting and displaying the currently-generated virtual parking image.

In an eighth possible implementation of the second aspect, the real parking image is located on an upper layer of the virtual parking image and displaying positions of the real parking image and the virtual parking image are not overlapped.

According to a third aspect of embodiments of the present disclosure, there is provided a storage medium, storing a computer program thereon, where the program is executed by a processor to perform the method of any possible implementation of the first aspect.

According to a fourth aspect of embodiments of the present disclosure, there is provided an electronic device, including:
one or more processors;
a storage apparatus, configured to store one or more programs;
where when one or more programs are executed by one or more processors to cause the electronic device to perform the method of any possible implementation of the first aspect.

According to a fifth aspect of embodiments of the present disclosure, there is provided a vehicle, including the apparatus of any possible implementation of the second aspect, or the electronic device of the fourth aspect.

BRIEF DESCRIPTION OF THE DRAWINGS

In order to more clearly describe the technical solution in the embodiments of the present disclosure or in the prior arts, the drawings required for descriptions of the embodiments or the prior arts will be briefly introduced below. Apparently, the drawings described hereunder are only some embodiments of the present disclosure. Those skilled in the art may obtain other drawings based on these drawings without making creative work.

DETAILED DESCRIPTION OF THE EMBODIMENTS

The technical solution of the present disclosure will be fully and clearly described below in combination with the drawings in the embodiments of the present disclosure. Apparently, the embodiments described herein are only some embodiments of the present disclosure rather than all embodiments. All other embodiments obtained by those skilled in the art based on these embodiments without making creative work shall all fall within the scope of protection of the present disclosure.

It should be noted that, in a case of no conflicts, the embodiments of the present disclosure or features in the embodiments may be mutually combined. The terms such as "include" and "have" and any variations thereof in the embodiments and the drawings of the present disclosure are intended to cover the non-exclusive inclusion. For example, processes, methods, systems, products or devices including a series of steps or units are not limited to those listed steps or units but optionally further include those unlisted steps or units or optionally further include other steps or units inherent to these processes, methods, products or devices.

Figure 1:
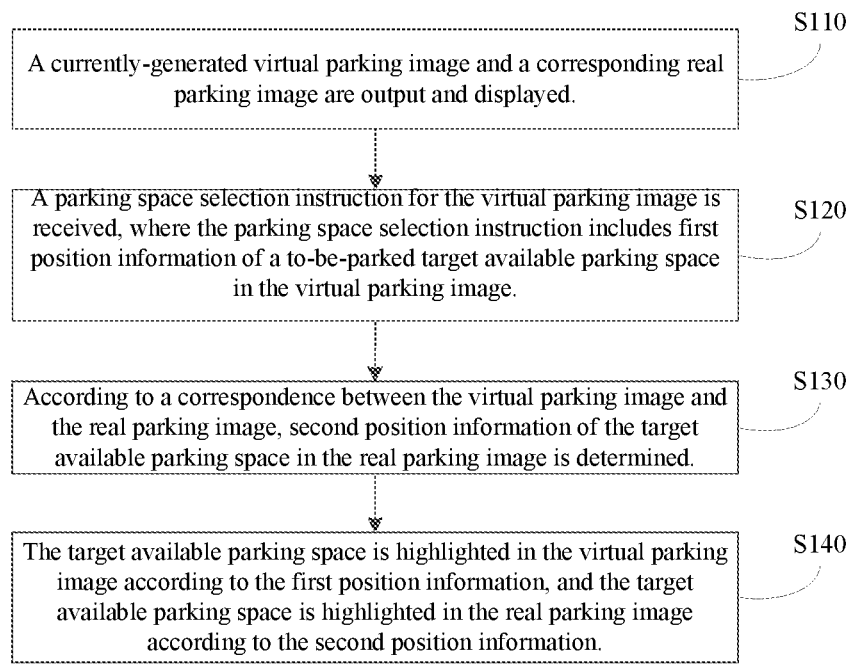
FIG. 1 is a flowchart illustrating a parking interaction method according to an embodiment of the present disclosure.

FIG. 1 is a flowchart illustrating a parking interaction method. The method may be applied to an electronic device or computer device, and specifically may be applied to a vehicle or another electronic device (e.g. mobile terminal) in interaction with the vehicle. The method may include the following steps.

At step S110, a currently-generated virtual parking image and a corresponding real parking image are output and displayed.

The virtual parking image is a virtual reality (VR) image containing a self-driving vehicle, occupied parking space and available parking spaces, which is generated when obstacles and available parking spaces around the self-driving vehicle are recognized by using radar; the real parking image is an image of a field of view ahead of (or behind) the self-driving vehicle. The radar includes a laser radar and a millimeter wave radar, and the camera includes a monocular camera and a binocular camera.

When the embodiments of the present disclosure are applied to a vehicle, the vehicle may generate a virtual parking image and a corresponding real parking image and output and display them on a vehicle-mounted central control screen, or output and display them on a front windshield based on Head Up Display (HUD). When the embodiments of the present disclosure are applied to another electronic device (e.g. mobile terminal) in interaction with the vehicle, the vehicle may generate a virtual parking image and a corresponding real parking image and then send the virtual parking image and the real parking image to the another electronic device which then outputs and displays the virtual parking image and the real parking image.

The virtual parking image and the real parking image may be arranged up and down or left and right. The real parking image may be located on an upper layer of the virtual parking image, or on a lower layer of the virtual parking image, or on the same layer as the virtual parking image, as long as the display positions of the real parking image and the virtual parking image are not overlapped. The upper layer, the lower layer and the same layer described herein refer to an image layer.

In one implementation, after an automatic parking system is started, at the time of garage search or reversing, it is more possible that a driver will have more difficulty in comparing the virtual parking image with the real world. Therefore, in order to save resources on the basis of improving the parking experiences for the driver and increasing the parking efficiency, after the automatic parking system is started, a currently-generated virtual parking image may be output and displayed; when a garage-searching instruction is received or Reverse (R) gear is engaged, a currently-generated real parking image is output and displayed on the basis of outputting and displayed the currently-generated virtual parking image. In this case, the real parking image can be directly output to the upper layer of the virtual parking image, so as to promote the double-image outputting efficiency.

At step S120, a parking space selection instruction for the virtual parking image is received, where the parking space selection instruction includes first position information of a to-be-parked target available parking space in the virtual parking image.

In practical applications, each available parking space in the virtual parking image may be disposed as a clickable control for being selected by a user by clicking, or one button clickable by the user may be disposed on the upper layer of each available parking space, or each available parking space may be numbered such that the user can make selection by inputting a number by using an input key provided on a display apparatus. No matter which human-machine interaction mode is adopted, the control or number can be bound with the position information of the corresponding available parking space. When the vehicle receives a parking space selection instruction from the user, the vehicle can obtain first position information of a to-be-parked target available parking space in the virtual parking image.

At step S130, according to a correspondence between the virtual parking image and the real parking image, second position information of the target available parking space in the real parking image is determined.

Regardless of the virtual parking image or the real parking image, depth information and object features contained in the images are in mutual correspondence. For example, for a same parking space, a distance from a self-driving vehicle to the parking space may be respectively represented by the depth information in the virtual parking image and the depth information in the real parking image. As a result, based on the correspondence between the virtual parking image and the real parking image, the second position information of the target available parking space in the real parking image can be determined.

Specifically, the second position information may be determined by distance (or depth) matching. Firstly, a target radar point cloud corresponding to the first position information is obtained, and a depth map corresponding to the real parking image is obtained; then, target depth information corresponding to the target radar point cloud is searched for in the depth map; finally, position information at the target depth information is determined as the second position information. The depth map includes depth information of from a camera to a target object. The monocular camera the depth information included in the real parking image by relative distance movement, and the binocular camera may directly obtain the depth information included in the real parking image.

In one embodiment, before the position information at the target depth information is determined as the second position information, based on a computer vision algorithm, available parking spaces in the real parking image may be recognized as candidate available parking spaces; in response to that depth information of the candidate available parking space includes the target depth information, the position information at the target depth information is determined as the second position information.

based on the computer vision algorithm, recognizing an available parking space in the real parking image includes: based on a parking space line recognition model, recognizing an available parking space in the real parking image, where the parking space line recognition model is trained with a large number of historical real parking images marking the parking space line of the available parking spaces based on a neural network.

In the embodiments of the present disclosure, by achieving distance (or depth) matching for the target radar point cloud corresponding to the first position information in the virtual parking image and the depth map corresponding to the real parking image, the target depth information corresponding to the target radar point cloud is obtained, and when the target depth information is determined as depth information of a candidate available parking space in the real parking image, the position information at the target depth information is determined as the second position information of the target available parking space in the real parking image. Thus, it is further ensured that an available parking space is present at the determined second position information rather than at other positions, for example, occupied parking space, vehicle lane or other vacant places or the like, so as to improve the accuracy of determining the second position information.

In one implementation, in response to that the depth information of the candidate available parking space does not include the target depth information, in the embodiments of the present disclosure, a first reference object feature may be determined based on radar point cloud around the target radar point cloud; based on the computer vision algorithm, a second reference object feature around each candidate available parking space is recognized; position information of a target candidate available parking space is determined as the second position information, where the target candidate available parking space is a candidate available parking space corresponding to the second reference object feature and successfully matching the first reference object feature. "Around" may refer to a circular area with the target radar point cloud or the candidate available parking space as center and R as radius, or an area of another shape, which is not limited in the embodiments of the present disclosure. The reference object feature is used to describe a size and a shape of a reference object. For example, when the depth information of the candidate available parking space does not include the target depth information, auxiliary matching may be performed by using reference objects such as surrounding pillars to further determine the second position information.

In the embodiments of the present disclosure, in response to failure to accurately obtain the second position information by distance (or depth) matching, the second position information can be determined by matching of the reference object features, so as to improve the accuracy of determining the second position information.

At step S140, the target available parking space is highlighted in the virtual parking image according to the first position information, and the target available parking space is highlighted in the real parking image according to the second position information.

Figure 2:
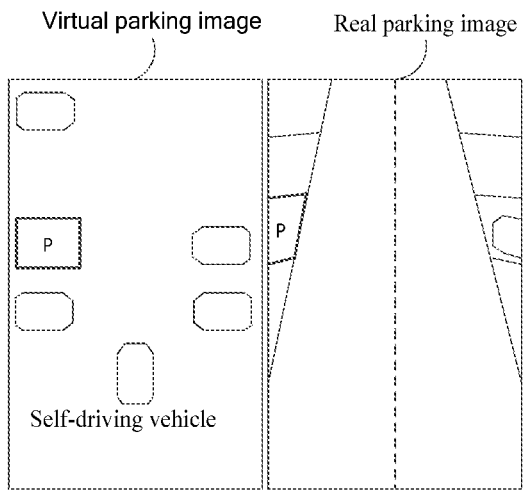
FIG. 2 is a diagram illustrating an image example of parking interaction according to an embodiment of the present disclosure.

The highlighting includes highly-brightening, changing line color, adding markings and the like, such that the driver can visually and quickly see the display mode of the target available parking space. As shown in FIG. 2, at the left is the virtual parking image and at the right is the real parking image, and the target available parking spaces are respectively highlighted in bold line, and further, a parking sign "P" is added to the target available parking spaces. In this case, the driver can quickly view the correspondence of both.

In the parking interaction method provided by the embodiments of the present disclosure, a virtual parking image and a corresponding real parking image can be displayed at the same time, and when a driver selects a target available parking space in the virtual parking image, the target available parking space can be highlighted in both the virtual parking image and the real parking image. Thus, the driver can visually obtain a correspondence between the target available parking spaces in the virtual parking image and the real parking image without comparing, with efforts, the virtual parking image with the real physical world. Therefore, the parking efficiency is improved and the reliability of the automatic parking system is increased.

In one implementation, in order to enable the driver to know visually and in advance, an actual running path from the self-driving vehicle to the target available parking space so as to further enhance the immersive parking experience for the driver, in the embodiments of the present disclosure, after the target available parking space is highlighted in the virtual parking image according to the first position information and the target available parking space is highlighted in the real parking image according to the second position information, a planned path from the self-driving vehicle to the second position information is highlighted in the real parking image in a parking stage. The method of highlighting the planned path may be same as or different from the method for highlighting the target available parking space. In order to avoid affecting the watching feel of the driver, one white and somewhat transparent image layer may be covered on a road surface in the real parking image.

In one implementation, when the driver starts the automatic parking system, it is possible that parking operation cannot be successfully and safely performed subsequently due to reasons such as not closing a door of the vehicle or not closing a trunk of the vehicle or the like. In order to solve the technical problem, in the embodiments of the present disclosure, after a start instruction of the automatic parking system is received, whether a first vehicle component is present is determined, where the first vehicle component is a vehicle component with a current entity state not satisfying an automatic parking condition; in response to presence of the first vehicle component, a virtual state of the first vehicle component of a self-driving vehicle model in an initially-generated virtual parking image is adjusted to the current entity state of the first vehicle component; the state-adjusted virtual parking image is output and displayed and the first vehicle component is highlighted; and, first parking prompt information is output, where the first parking prompt information is used to prompt a driver to adjust the current entity state of the first vehicle component to a state satisfying the automatic parking condition.

The first vehicle component includes vehicular door and vehicular trunk and the like, and the method of highlighting the first vehicle component may be same as or different from the method for highlighting the target available parking space. The first parking prompt information may be displayed in the blank position of the virtual parking image in the form of text or output in the form of voice, or short message or the like.

Figure 3:
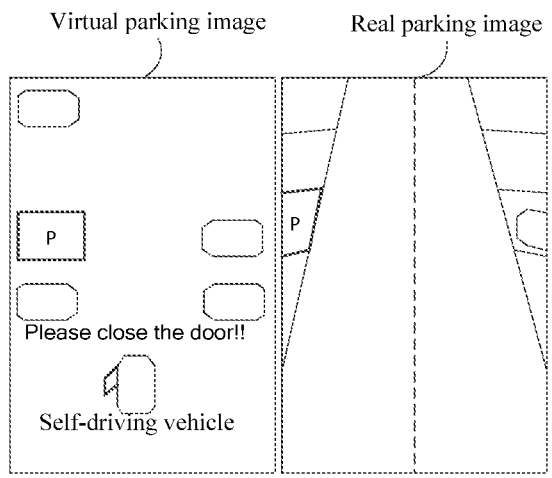
FIG. 3 is a diagram illustrating another image example of parking interaction according to an embodiment of the present disclosure.

Illustratively, as shown in FIG. 3, the front left door of the self-driving vehicle model in the virtual parking image is in an opened state and is highlighted, and the first parking prompt information of "please close the door" is also displayed in the virtual parking image. Therefore, the driver can visually and quickly realize that it is required to close the front left door before the automatic parking.

In the parking interaction method of the embodiments of the present disclosure, when the automatic parking condition is not satisfied, in addition to providing the first parking prompt information to the driver, the virtual state of the first vehicle component of the self-driving vehicle model in the initially-generated virtual parking image is adjusted to the current entity state of the first vehicle component, and when the state-adjusted virtual parking image is output and displayed, the first vehicle component is highlighted. In this way, the state of the self-driving vehicle model is made consistent with the state of the vehicle in the real world to provide the driver with an immersive experience, and further, the driver can visually and quickly find which first vehicle component does not satisfy the automatic parking condition and how to adjust, by combining the first parking prompt information with the highlighted first vehicle component, thereby increasing the efficiency of the driver for adjusting the first vehicle component and hence improving the parking efficiency.

In one implementation, after the target available parking space is highlighted in the virtual parking image according to the first position information, and the target available parking space is highlighted in the real parking image according to the second position information, the method provided by the embodiments of the present disclosure further includes:
  in response to presence of a second vehicle component in the parking stage, along with change of an entity state of the second vehicle component, updating a virtual state of the second vehicle component of the self-driving vehicle model in the virtual parking image, and when displaying the updated virtual parking image, highlighting the second vehicle component, where the second vehicle component is a vehicle component with an entity state subjected to visual dynamic change in the parking stage; and/or,
  in response to presence of a third vehicle component in the parking stage, when displaying the currently-generated virtual parking image, highlighting the third vehicle component and outputting second parking prompt information, where the third vehicle component is a vehicle component subjected to a parking operation error, and the second parking prompt information is used to prompt the driver about the parking operation error.

The second vehicle component includes a steering wheel and the third vehicle component includes a brake pedal and an acceleration pedal and the like. The second parking prompt information may be displayed in the blank position of the virtual parking image in the form of text or output in the form of voice, or short message or the like. Different from the method of highlighting the target available parking space or the like, since the second vehicle component and the third vehicle component may be components inside the vehicle, the scope of the self-driving vehicle model displayed when the second vehicle component or the third vehicle component is highlighted is possibly not a panoramic scope but a local field-of-view scope including the second vehicle component or the third vehicle component, with the display format being same as that of highlighting the target available parking space or the like, for example, highly brightening. In other words, when the second vehicle component or the third vehicle component is a component on an external surface of the vehicle, the self-driving vehicle model is of a panoramic scope; when the second vehicle component or the third vehicle component is a component inside the vehicle, the self-driving vehicle model may be of a local field-of-view scope including the second vehicle component or the third vehicle component.

Figure 4:
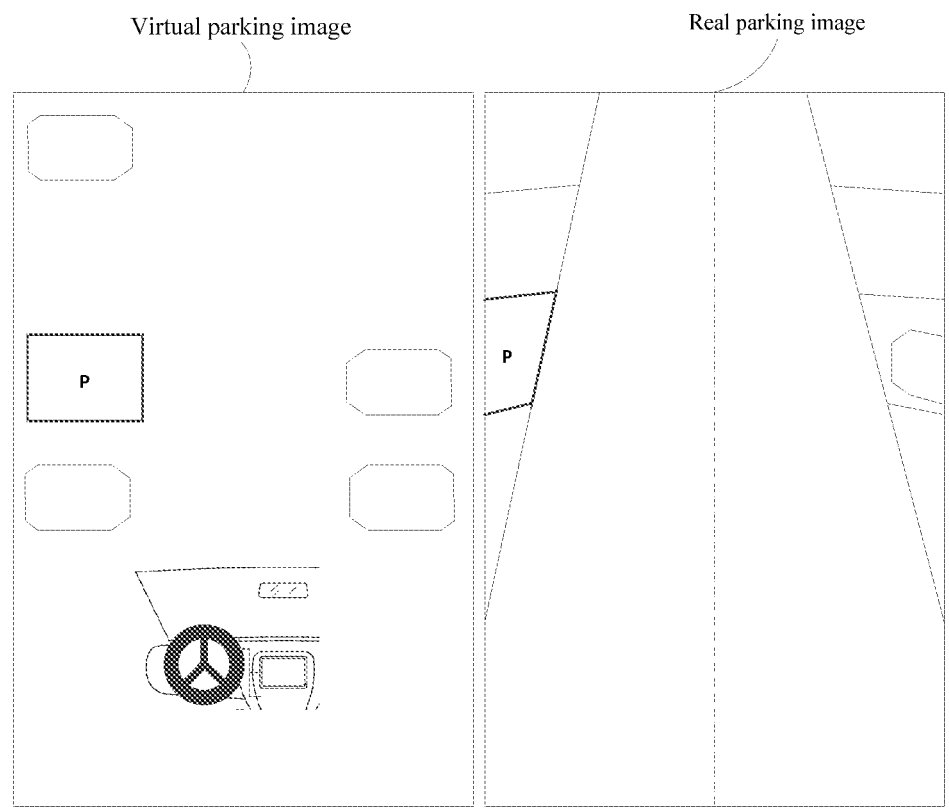
FIG. 4 is an exemplary diagram illustrating a self-driving vehicle model in a virtual parking image according to an embodiment of the present disclosure.

For example, as shown in FIG. 4, in the parking stage, the steering wheel of the self-driving vehicle model may rotate along with the rotation of the steering wheel of the physical vehicle, the steering wheel may be highlighted, and a local field-of-view scope is displayed at the time of displaying the self-driving vehicle model. For another example, in the parking stage, when the driver performs incorrect operation of stepping on the brake pedal or acceleration pedal, stepping on the brake pedal or acceleration pedal can be highlighted in the self-driving vehicle model of the virtual parking image and a text prompt of a parking operation error is displayed, such that the driver can quickly know which operation is incorrect and corrected in time.

In the parking interaction method of the embodiments of the present disclosure, in the parking stage, by making the virtual state of the second vehicle component in the self-driving vehicle model consistent with the entity state of the vehicle in the real world and highlighting the second vehicle component, the driver, whether located in the vehicle or not, can visually view the state change of the self-driving vehicle, so as to provide an immersive parking interaction experience to the driver. When the driver performs incorrect parking operation in the parking stage, with the third vehicle component subjected to parking operation error being highlighted on the self-driving vehicle model and the provision of the second parking prompt information, the driver can visually and quickly determine the incorrect parking operation by combining the prompt information with the highlighted third vehicle component and correct it in time, so as to improve the parking efficiency.

Figure 5:
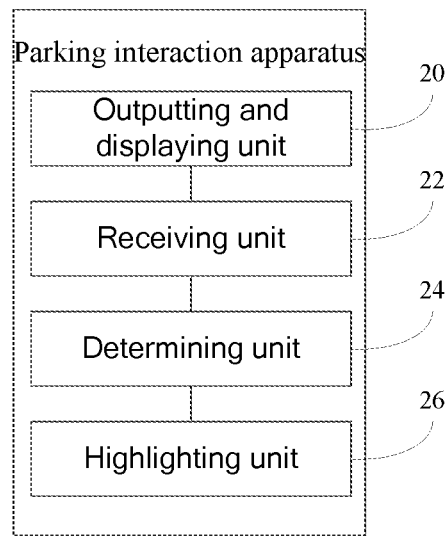
FIG. 5 is a block diagram illustrating composition of a parking interaction apparatus according to an embodiment of the present disclosure.

Corresponding to the above method embodiments, another embodiment of the present disclosure provides a parking interaction apparatus. As shown in FIG. 5, the apparatus includes:
an outputting and displaying unit 20, configured to output and display a currently-generated virtual parking image and a corresponding real parking image;
a receiving unit 22, configured to receive a parking space selection instruction for the virtual parking image, where the parking space selection instruction includes first position information of a to-be-parked target available parking space in the virtual parking image;
a determining unit 24, configured to, according to a correspondence between the virtual parking image and the real parking image, determine second position information of the target available parking space in the real parking image;
a highlighting unit 26, configured to highlight the target available parking space in the virtual parking image according to the first position information, and highlight the target available parking space in the real parking image according to the second position information.

In one embodiment, the determining unit 24 includes:
an obtaining module, configured to obtain a target radar point cloud corresponding to the first position information, and obtain a depth map corresponding to the real parking image;
a searching module, configured to search for target depth information corresponding to the target radar point cloud in the depth map;
a first determining module, configured to determine position information at the target depth information as the second position information.

In one embodiment, the determining unit 24 further includes:
a recognizing module, configured to, before determining the position information at the target depth information as the second position information, based on a computer vision algorithm, recognize available parking spaces in the real parking image as candidate available parking spaces;
the first determining module is configured to, in response to that depth information of the candidate available parking space includes the target depth information, determine the position information at the target depth information as the second position information.

In one embodiment, the determining unit 24 further includes:
a second determining module, configured to, in response to that the depth information of the candidate available parking space does not include the target depth information, determine a first reference object feature based on radar point cloud around the target radar point cloud;
the recognizing module is further configured to, based on the computer vision algorithm, recognize a second reference object feature around each candidate available parking space;
the first determining module is further configured to determine position information of a target candidate available parking space as the second position information, where the target candidate available parking space is a candidate available parking space corresponding to the second reference object feature and successfully matching the first reference object feature.

In one embodiment, the highlighting unit 26 is further configured to, after highlighting the target available parking space in the virtual parking image according to the first position information, and highlighting the target available parking space in the real parking image according to the second position information, highlight, in a parking stage, a planned path from a self-driving vehicle to the second position information in the real parking image.

In one embodiment, the outputting and displaying unit 20 is configured to:
after receiving a start instruction of an automatic parking system, determine whether there is a first vehicle component, where the first vehicle component is a vehicle component with a current entity state not satisfying an automatic parking condition;
in response to presence of the first vehicle component, adjust a virtual state of the first vehicle component of a self-driving vehicle model in an initially-generated virtual parking image to the current entity state of the first vehicle component;

output and display the state-adjusted virtual parking image and highlight the first vehicle component;

the apparatus further includes:

a first prompt-outputting unit, configured to output first parking prompt information, where the first parking prompt information is used to prompt a driver to adjust the current entity state of the first vehicle component to a state satisfying the automatic parking condition.

In one embodiment, the highlighting unit 26 is further configured to, after highlighting the target available parking space in the virtual parking image according to the first position information, and highlighting the target available parking space in the real parking image according to the second position information, in response to presence of a second vehicle component in the parking stage, along with change of an entity state of the second vehicle component, update a virtual state of the second vehicle component of the self-driving vehicle model in the virtual parking image, and when displaying the updated virtual parking image, highlight the second vehicle component where the second vehicle component is a vehicle component with an entity state subjected to visual dynamic change in the parking stage; and/or, in response to presence of a third vehicle component in the parking stage, when displaying the currently-generated virtual parking image, highlight the third vehicle component, where the third vehicle component is a vehicle component subjected to a parking operation error.

The apparatus further includes:

a second prompt-outputting unit, configured to, when highlighting the third vehicle component, output second parking prompt information, where the second parking prompt information is used to prompt the driver about the parking operation error.

In one embodiment, the outputting and displaying unit 20 includes:

a first outputting and displaying module, configured to, after the automatic parking system is started, output and display the currently-generated virtual parking image;

a second outputting and displaying module, configured to, when a garage-searching instruction is received or a Reverse (R) gear is engaged, output and display the currently-generated real parking image on the basis of outputting and displaying the currently-generated virtual parking image.

In one embodiment, the real parking image is located on an upper layer of the virtual parking image and displaying positions of the real parking image and the virtual parking image are not overlapped.

In the parking interaction apparatus provided in the embodiments of the present disclosure, a virtual parking image and a corresponding real parking image can be displayed at the same time, and when a driver selects a target available parking space in the virtual parking image, the target available parking space can be highlighted in both the virtual parking image and the real parking image. Thus, the driver can visually obtain a correspondence between the target available parking spaces in the virtual parking image and the real parking image without comparing, with efforts, the virtual parking image with the real physical world. Therefore, the parking efficiency is improved and the reliability of the automatic parking system is increased.

Based on the above method embodiments, another embodiment of the present disclosure provides a storage medium, storing executable instructions thereon, where the instructions are executed by a processor to cause the processor to perform the method of any one of the above embodiments.

Based on the above method embodiments, another embodiment of the present disclosure provides an electronic device or a computer device, including:

one or more processors;

a storage apparatus, configured to store one or more programs;

when one or more programs are executed by one or more processors to cause the electronic device or the computer device to perform the method of any one of the above embodiments.

Based on the above method embodiments, another embodiment of the present disclosure provides a vehicle, including the apparatus of any one of the above embodiments, or the electronic device as described above.

Figure 6:
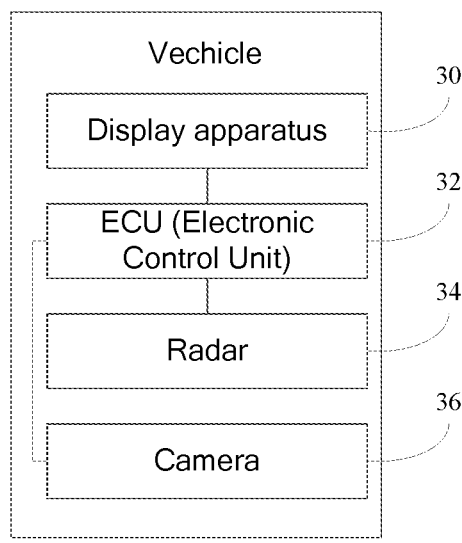
FIG. 6 is a block diagram illustrating composition of a vehicle according to an embodiment of the present disclosure.

As shown in FIG. 6, the vehicle includes a display apparatus 30, an Electronic Control Unit (ECU) 32, a radar 34 and a camera 36. The radar 34 is configured to generate a radar point cloud, the camera 36 is configured to collect a real parking image, and the ECU 32 is configured to generate a virtual parking image based on the radar point cloud and transmit the virtual parking image and the real parking image to the display apparatus 30 for outputting and displaying. The display apparatus 30 is configured to receive a parking space selection instruction for the virtual parking image, where parking space selection instruction includes first position information of a target available parking space to be parked in the virtual parking image, and send the parking space selection instruction to the ECU 32; the ECU 32, based on a correspondence between the virtual parking image and the real parking image, determines second position information of the target available parking space in the real parking image, and then sends the first position information and the second position information to the display apparatus 30; the display apparatus 30 highlights the target available parking space in the virtual parking image according to the first position information and highlights the target available parking space in the real parking image according to the second position information, where the display apparatus 30 includes a vehicle-mounted central control screen and a windshield based on HUD and the like.

The vehicle may further include a Global Positioning System (GPS) positioning apparatus, a TelematicsBox (T-Box, remote information processor), and a Vehicle-to-Everything (V2X) module. The GPS positioning apparatus is used to obtain a current geographical position of the vehicle; T-Box is used to serve as a gateway to communicate with an external device; and V2X module is used to communicate with other vehicles and roadside devices and the like.

Since the above apparatus embodiments correspond to the method embodiments, the apparatus embodiments have the same technical effect as the method embodiments and reference may be made to the method embodiments for specific descriptions. The apparatus embodiments are obtained based on the method embodiments, and reference may be made to the method embodiments for specific descriptions. No redundant descriptions will be made herein. Those skilled in the arts should understand that the accompanying drawings are merely illustrations of one embodiment and the modules or flows in the drawings are not necessarily required for implementing the present disclosure.

Persons of ordinary skills in the arts may understand that the modules in the apparatus of the embodiment may be distributed in the apparatus of the embodiment according to the descriptions of the embodiment and may also be changed accordingly to be located in one or more apparatuses different from the present embodiment. The modules in the above embodiment may be combined into one module or may be split into multiple modules.

Finally, it should be noted that the above embodiments are used only to describe the technical solution of the present disclosure rather than to limit the present disclosure. Although the present disclosure is described in details by referring to the preceding embodiments, persons of ordinary skills in the art should understand that they still can make changes to the technical solution of the preceding embodiments or make equivalent substitution to partial technical features therein, and these changes or substitutions will not cause the essence of the corresponding technical solutions to depart from the spirit and scope of the technical solution of the present disclosure.

What is claimed is:

1. A parking interaction method, comprising:
    outputting and displaying a currently-generated virtual parking image and a corresponding real parking image;
    receiving a parking space selection instruction for the virtual parking image, wherein the parking space selection instruction comprises first position information of a to-be-parked target available parking space in the virtual parking image;
    according to a correspondence between the virtual parking image and the real parking image, determining second position information of the target available parking space in the real parking image;
    according to the first position information, highlighting the target available parking space in the virtual parking image, and according to the second position information, highlighting the target available parking space in the real parking image.

2. The method of claim 1, wherein according to the correspondence between the virtual parking image and the real parking image, determining the second position information of the target available parking space in the real parking image comprises:
    obtaining a target radar point cloud corresponding to the first position information, and obtaining a depth map corresponding to the real parking image;
    searching for target depth information corresponding to the target radar point cloud in the depth map;
    determining position information at the target depth information as the second position information.

3. The method of claim 2, wherein before determining the position information at the target depth information as the second position information, the method further comprises:
    based on a computer vision algorithm, recognizing available parking spaces in the real parking image as candidate available parking spaces;
    determining the position information at the target depth information as the second position information comprises:
    in response to that depth information of the candidate available parking space comprises the target depth information, determining the position information at the target depth information as the second position information.

4. The method of claim 3, further comprising:
    in response to that the depth information of the candidate available parking space does not comprise the target depth information, determining a first reference object feature based on radar point cloud around the target radar point cloud;
    based on the computer vision algorithm, recognizing a second reference object feature around each candidate available parking space;
    determining position information of a target candidate available parking space as the second position information, wherein the target candidate available parking space is a candidate available parking space corresponding to the second reference object feature and successfully matching the first reference object feature.

5. The method of claim 1, wherein after highlighting the target available parking space in the virtual parking image according to the first position information, and highlighting the target available parking space in the real parking image according to the second position information, the method further comprises:
    in a parking stage, highlighting a planned path from a self-driving vehicle to the second position information in the real parking image.

6. The method of claim 1, wherein outputting and displaying the currently-generated virtual parking image comprises:
    after receiving a start instruction of an automatic parking system, determining whether there is a first vehicle component, wherein the first vehicle component is a vehicle component with a current entity state not satisfying an automatic parking condition;
    in response to presence of the first vehicle component, adjusting a virtual state of the first vehicle component of a self-driving vehicle model in an initially-generated virtual parking image to the current entity state of the first vehicle component;
    outputting and displaying the state-adjusted virtual parking image and highlighting the first vehicle component;
    the method further comprises:
    outputting first parking prompt information, wherein the first parking prompt information is used to prompt a driver to adjust the current entity state of the first vehicle component to a state satisfying the automatic parking condition.

7. The method of claim 1, wherein after highlighting the target available parking space in the virtual parking image according to the first position information, and highlighting the target available parking space in the real parking image according to the second position information, the method further comprises at least one of the following:
    in response to presence of a second vehicle component in the parking stage, along with change of an entity state of the second vehicle component, updating a virtual state of the second vehicle component of the self-driving vehicle model in the virtual parking image, and when displaying the updated virtual parking image, highlighting the second vehicle component wherein the second vehicle component is a vehicle component with an entity state subjected to visual dynamic change in the parking stage; or,
    in response to presence of a third vehicle component in the parking stage, when displaying the currently-generated virtual parking image, highlighting the third vehicle component and outputting second parking prompt information, wherein the third vehicle component is a vehicle component subjected to a parking operation error, and the second parking prompt information is used to prompt the driver about the parking operation error.

8. The method of claim 1, wherein outputting and displaying the currently-generated virtual parking image and the corresponding real parking image comprises:
   after starting the automatic parking system, outputting and displaying the currently-generated virtual parking image;
   when a garage-searching instruction is received or a Reverse (R) gear is engaged, outputting and displaying the currently-generated real parking image on the basis of outputting and displaying the currently-generated virtual parking image.

9. The method of claim 1, wherein the real parking image is located on an upper layer of the virtual parking image and displaying positions of the real parking image and the virtual parking image are not overlapped.

10. A parking interaction apparatus, comprising:
   one or more processors, and a non-transitory storage medium in communication with the one or more processors, the non-transitory storage medium configured to store program instructions, wherein, when executed by the one or more processors, the instructions cause the apparatus to perform:
   outputting and displaying a currently-generated virtual parking image and a corresponding real parking image;
   receiving a parking space selection instruction for the virtual parking image, wherein the parking space selection instruction comprises first position information of a to-be-parked target available parking space in the virtual parking image;
   determining according to a correspondence between the virtual parking image and the real parking image, determine second position information of the target available parking space in the real parking image;
   highlighting the target available parking space in the virtual parking image according to the first position information, and highlighting the target available parking space in the real parking image according to the second position information.

11. A vehicle, comprising the apparatus of claim 10.

12. The apparatus of claim 10, wherein the determining according to a correspondence between the virtual parking image and the real parking image, determine second position information of the target available parking space in the real parking image comprises:
   obtaining a target radar point cloud corresponding to the first position information, and obtain a depth map corresponding to the real parking image;
   searching for target depth information corresponding to the target radar point cloud in the depth map;
   determining position information at the target depth information as the second position information.

13. The apparatus of claim 12, wherein the determining according to a correspondence between the virtual parking image and the real parking image, determine second position information of the target available parking space in the real parking image comprises:
   recognizing before determining the position information at the target depth information as the second position information, based on a computer vision algorithm, recognize available parking spaces in the real parking image as candidate available parking spaces;
   determining in response to that depth information of the candidate available parking space comprises the target depth information, determine the position information at the target depth information as the second position information.

14. The apparatus of claim 13, wherein the determining according to a correspondence between the virtual parking image and the real parking image, determine second position information of the target available parking space in the real parking image comprises:
   determining in response to that the depth information of the candidate available parking space does not comprise the target depth information, determine a first reference object feature based on radar point cloud around the target radar point cloud;
   recognizing based on the computer vision algorithm, recognize a second reference object feature around each candidate available parking space;
   determining position information of a target candidate available parking space as the second position information, wherein the target candidate available parking space is a candidate available parking space corresponding to the second reference object feature and successfully matching the first reference object feature.

15. The apparatus of claim 10, wherein the highlighting the target available parking space in the virtual parking image according to the first position information, and highlighting the target available parking space in the real parking image according to the second position information is further configured to, after highlighting the target available parking space in the virtual parking image according to the first position information, and highlighting the target available parking space in the real parking image according to the second position information, highlight, in a parking stage, a planned path from a self-driving vehicle to the second position information in the real parking image.

16. The apparatus of claim 11, wherein the outputting and displaying a currently-generated virtual parking image and a corresponding real parking image is configured to, after receiving a start instruction of an automatic parking system, determine whether there is a first vehicle component, wherein the first vehicle component is a vehicle component with a current entity state not satisfying an automatic parking condition; in response to presence of the first vehicle component, adjust a virtual state of the first vehicle component of a self-driving vehicle model in an initially-generated virtual parking image to the current entity state of the first vehicle component; output and display the state-adjusted virtual parking image and highlight the first vehicle component;
   the apparatus further comprises:
   outputting first parking prompt information, wherein the first parking prompt information is used to prompt a driver to adjust the current entity state of the first vehicle component to a state satisfying the automatic parking condition.

17. The apparatus of claim 11, wherein the highlighting the target available parking space in the virtual parking image according to the first position information, and highlighting the target available parking space in the real parking image according to the second position information is further configured to, after highlighting the target available parking space in the virtual parking image according to the first position information, and highlighting the target available parking space in the real parking image according to the second position information, in response to presence of a second vehicle component in the parking stage, along with change of an entity state of the second vehicle component, update a virtual state of the second vehicle component of the self-driving vehicle model in the virtual parking image, and when displaying the updated virtual parking image, highlight the second vehicle component wherein the second vehicle component is a vehicle component with an entity state subjected to visual dynamic change in the parking stage; and/or, in response to presence of a third vehicle component in the parking stage, when displaying the currently-generated virtual parking image, highlight the third vehicle component, wherein the third vehicle component is a vehicle component subjected to a parking operation error;

the apparatus further comprises:

when highlighting the third vehicle component, outputting second parking prompt information, wherein the second parking prompt information is used to prompt the driver about the parking operation error.

18. The apparatus of claim 11, wherein the outputting and displaying a currently-generated virtual parking image and a corresponding real parking image comprises:

after the automatic parking system is started, outputting and displaying the currently-generated virtual parking image;

a when a garage-searching instruction is received or a Reverse (R) gear is engaged, outputting and displaying the currently-generated real parking image on the basis of outputting and displaying the currently-generated virtual parking image.

19. A non-transitory storage medium, storing a computer program thereon, wherein the program is executed by a processor to perform the method of claim 1.

20. An electronic device, comprising:

one or more processors;

a storage apparatus, configured to store one or more programs;

wherein when one or more programs are executed by one or more processors to cause the electronic device to perform the method of claim 1.

* * * * *